US012035091B2

(12) United States Patent
Lee et al.

(10) Patent No.: US 12,035,091 B2
(45) Date of Patent: Jul. 9, 2024

(54) ELECTRONIC DEVICE INCLUDING MICROPHONE MODULE

(71) Applicant: Samsung Electronics Co., Ltd., Suwon-si (KR)

(72) Inventors: Seunga Lee, Suwon-si (KR); Yongwook Park, Suwon-si (KR); Yongbum Jeung, Suwon-si (KR); Jaewon Kim, Suwon-si (KR); Yunhee Nam, Suwon-si (KR); Seungnyun Kim, Suwon-si (KR); Yongsang Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 185 days.

(21) Appl. No.: 17/696,499

(22) Filed: Mar. 16, 2022

(65) Prior Publication Data

US 2022/0400326 A1 Dec. 15, 2022

Related U.S. Application Data

(63) Continuation of application No. PCT/KR2022/002520, filed on Feb. 21, 2022.

(30) Foreign Application Priority Data

Jun. 10, 2021 (KR) ........................ 10-2021-0075678

(51) Int. Cl.
*H04R 1/08* (2006.01)
*H04R 1/10* (2006.01)
*H04R 1/28* (2006.01)

(52) U.S. Cl.
CPC .......... *H04R 1/083* (2013.01); *H04R 1/1075* (2013.01); *H04R 1/2876* (2013.01); *H04R 2410/07* (2013.01)

(58) Field of Classification Search
CPC .... H04R 1/083; H04R 1/1075; H04R 1/2876; H04R 2410/07
See application file for complete search history.

(56) References Cited

U.S. PATENT DOCUMENTS

| | | | |
|---|---|---|---|
| 5,574,794 | A | 11/1996 | Valley |
| 6,390,543 | B1 | 5/2002 | Tolinski |
| 2006/0034476 | A1 | 2/2006 | Glezerman |

(Continued)

FOREIGN PATENT DOCUMENTS

| | | | |
|---|---|---|---|
| JP | 2007-235768 | A | 9/2007 |
| KR | 10-2014-0125969 | A | 10/2014 |

(Continued)

OTHER PUBLICATIONS

International Search Report dated May 30, 2022, issued in International Application No. PCT/KR2022/002520.

*Primary Examiner* — Suhan Ni
(74) *Attorney, Agent, or Firm* — Jefferson IP Law, LLP

(57) ABSTRACT

An electronic device is provided. The electronic device includes a housing including a microphone hole, a support member connected to the housing, wherein the support member includes an antenna structure facing at least a part of the housing and a microphone chamber configured to receive external sound of the electronic device from the microphone hole, and a microphone module connected to the support member and configured to receive external sound of the electronic device through the microphone hole and the microphone chamber.

20 Claims, 12 Drawing Sheets

(56) References Cited

U.S. PATENT DOCUMENTS

| | | | |
|---|---|---|---|
| 2014/0153733 | A1 | 6/2014 | Llewellyn |
| 2014/0311499 | A1 | 10/2014 | Lee et al. |
| 2015/0092974 | A1 | 4/2015 | Almeflo |
| 2015/0215693 | A1 | 7/2015 | Sandanger |
| 2016/0050474 | A1 | 2/2016 | Rye et al. |
| 2017/0280230 | A1 | 9/2017 | Kim et al. |
| 2018/0213072 | A1 | 7/2018 | Shi et al. |
| 2020/0128337 | A1 | 4/2020 | Lindberg |
| 2021/0014598 | A1 | 1/2021 | Pine et al. |

FOREIGN PATENT DOCUMENTS

| | | | |
|---|---|---|---|
| KR | 10-1744507 | B1 | 6/2017 |
| KR | 10-2017-0110884 | A | 10/2017 |
| KR | 10-2019-0025029 | A | 3/2019 |
| WO | 2005/067653 | A2 | 7/2005 |
| WO | 2019/100081 | A2 | 5/2019 |
| WO | 2020/263754 | A1 | 12/2020 |

ELECTRONIC DEVICE INCLUDING MICROPHONE MODULE

CROSS-REFERENCE TO RELATED APPLICATION(S)

This application is a continuation application, claiming priority under § 365(c), of an International application No. PCT/KR2022/002520, filed on Feb. 21, 2022, which is based on and claims the benefit of a Korean patent application number 10-2021-0075678, filed on Jun. 10, 2021, in the Korean Intellectual Property Office, the disclosure of which is incorporated by reference herein in its entirety.

TECHNICAL FIELD

The disclosure relates to an electronic device including a microphone module.

BACKGROUND ART

Typically, an electronic device may mean a device that performs a function according to a program provided therein (e.g., an electronic scheduler, a portable multimedia reproducer, a mobile communication terminal, a tablet personal computer (PC), an image/sound device, a desktop/laptop PC, or a vehicle navigation system), as well as a home appliance. The above-mentioned electronic devices may output, for example, information stored therein as sound or an image. As the degree of integration of electronic devices has increased and ultra-high-speed and large-capacity wireless communication has become popular, multiple functions have recently come to be provided in a single electronic device, such as a mobile communication terminal. For example, various functions, such as an entertainment function (e.g., a game function), a multimedia function (e.g., a music/video reproducing function), a communication and security function for mobile banking, a schedule management function, or an e-wallet function, are integrated in a single electronic device, in addition to a communication function. Such an electronic device is being miniaturized so that a user can conveniently carry the electronic device. With the development of electronic and communication technology, electronic devices have been reduced in size and weight, so that the electronic devices can be used without inconvenience even in the state in which the electronic devices are worn on a body.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

An electronic device that is wearable on a body may include components related to one or more sound effects. For example, a wearable electronic device including a speaker and a microphone may be worn on a portion close to a user's ear like an in-ear earphone (or an earphone) or a hearing aid.

In a wearable electronic device, a microphone may perform an active noise canceling (ANC) function. The active noise canceling function may be a function to reduce noise by acquiring a noise-related wave using a microphone module, inverting the phase of the acquired wave, and then outputting the phase-inverted wave via a speaker. Noise generated inside or outside a wearable electronic device may be reduced by destructive interference using an active noise canceling function.

However, in a miniaturized electronic device, at least a part of a microphone module may vibrate due to wind flowing into the electronic device microphone hole, and wind noise may be generated. The active noise canceling function may be deteriorated due to the wind noise.

Aspects of the disclosure are to address at least the above-mentioned problems and/or disadvantages and to provide at least the advantages described below. Accordingly, an aspect of the disclosure is to provide an electronic device capable of reducing wind noise.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a housing including a microphone hole, a support member connected to the housing, wherein the support member includes an antenna structure facing at least a part of the housing and a microphone chamber configured to receive sound outside the electronic device from the microphone hole, and a microphone module connected to the support member and configured to receive sound outside the electronic device through the microphone hole and the microphone chamber.

In accordance with another aspect of the disclosure, an electronic device is provided. The electronic device includes a housing including a first microphone hole and a second microphone hole spaced apart from the first microphone hole, a support member connected to the housing and including an antenna structure facing at least a part of the housing, wherein the support member includes a first microphone chamber connected to the first microphone hole and a second microphone chamber connected to the second microphone hole absence, a microphone module including a first microphone module configured to acquire sound through the first microphone hole and the first microphone chamber, and a second microphone module configured to acquire sound through the second microphone hole and the second microphone chamber module, and a sound absorbing member arranged in at least one of the first microphone chamber or the second microphone chamber.

Advantageous Effects

In an electronic device according to various embodiments of the disclosure, it is possible to reduce wind noise using at least one of a microphone chamber or a sound absorbing member arranged in the microphone chamber. For example, at least a part of the wind transmitted to the electronic device can be transmitted to the microphone module through at least one of the microphone hole, the microphone chamber, and the sound absorbing member, and vibration of the microphone module caused by the wind can be reduced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
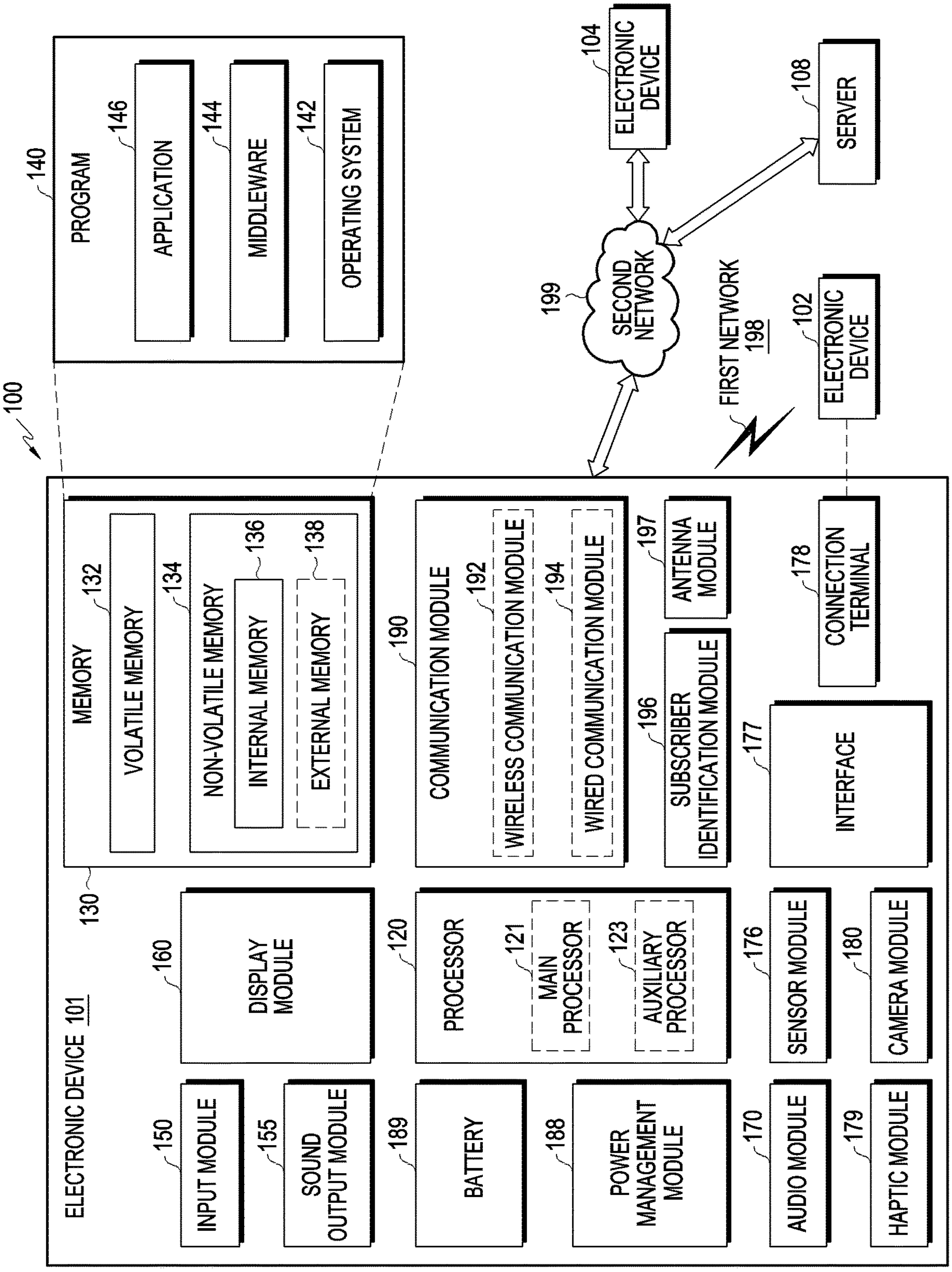
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160). The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an external electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN)

communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
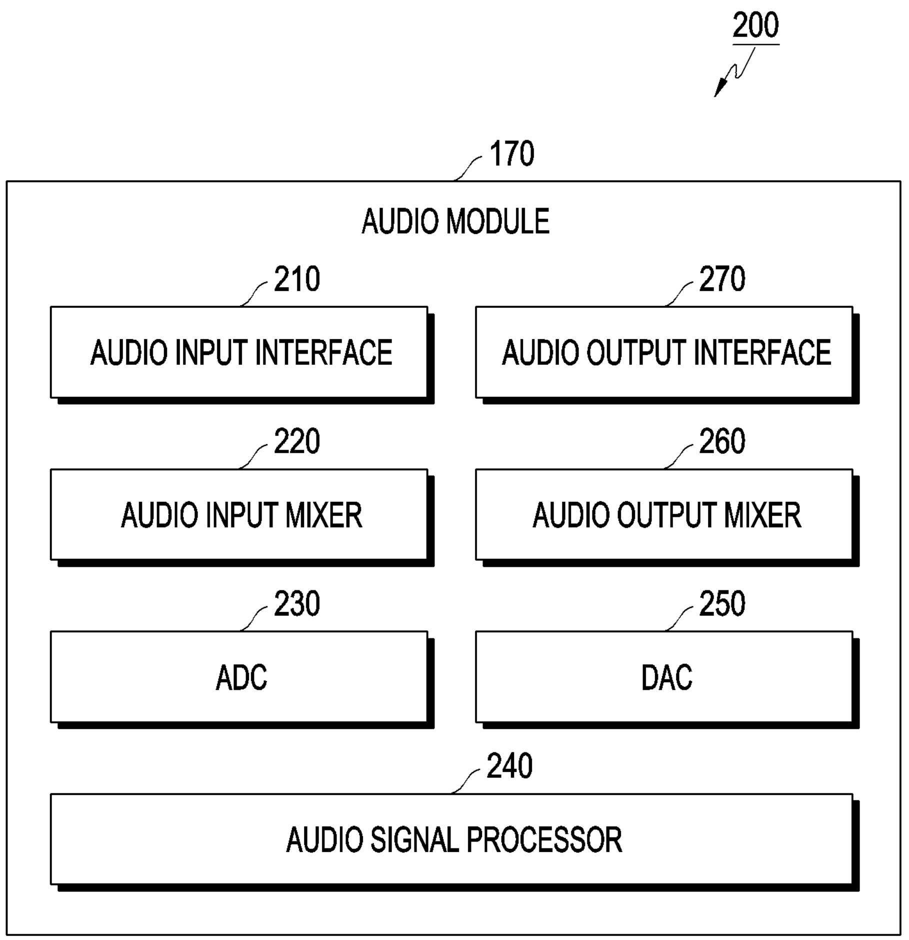
FIG. 2 is a block diagram illustrating an audio module according to an embodiment of the disclosure.

FIG. 2 is a block diagram 200 illustrating the audio module 170 according to an embodiment of the disclosure.

Referring to FIG. 2, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input device 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of inputted audio signals into at least one audio signal. For example, according to an embodiment, the audio input mixer 220 may synthesize a plurality of analog audio signals inputted via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor 120 or the memory 130) of the electronic device 101 into an analog audio signal.

The audio output mixer 260 may synthesize a plurality of audio signals, which are to be outputted, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output device 155. The sound output device 155 may include, for example, a speaker, such as a dynamic driver or a balanced armature driver, or a receiver. According to an embodiment, the sound output device 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal inputted via the audio input interface 210 or an audio signal that is to be outputted via the audio output interface 270. According to an embodiment, the audio amplifier may be configured as a module separate from the audio module 170.

Figure 3A:
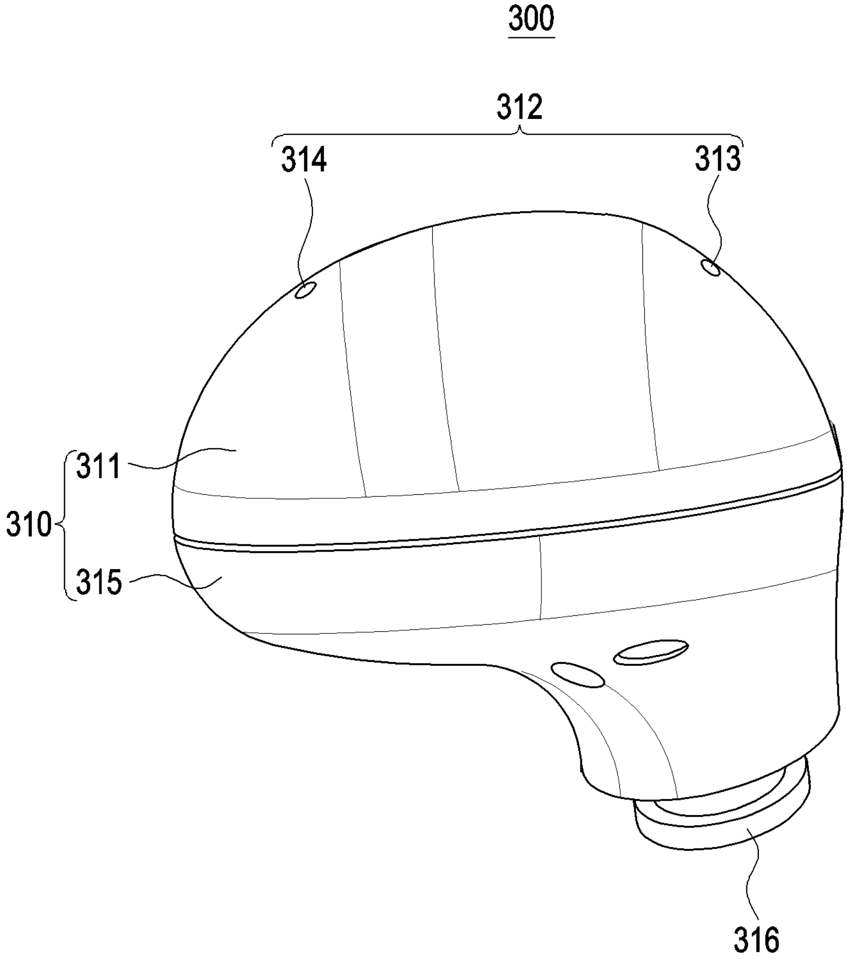
FIG. 3A is a side view of an electronic device according to an embodiment of the disclosure.

FIG. 3A is a side view of an electronic device according to an embodiment of the disclosure.

Figure 3B:
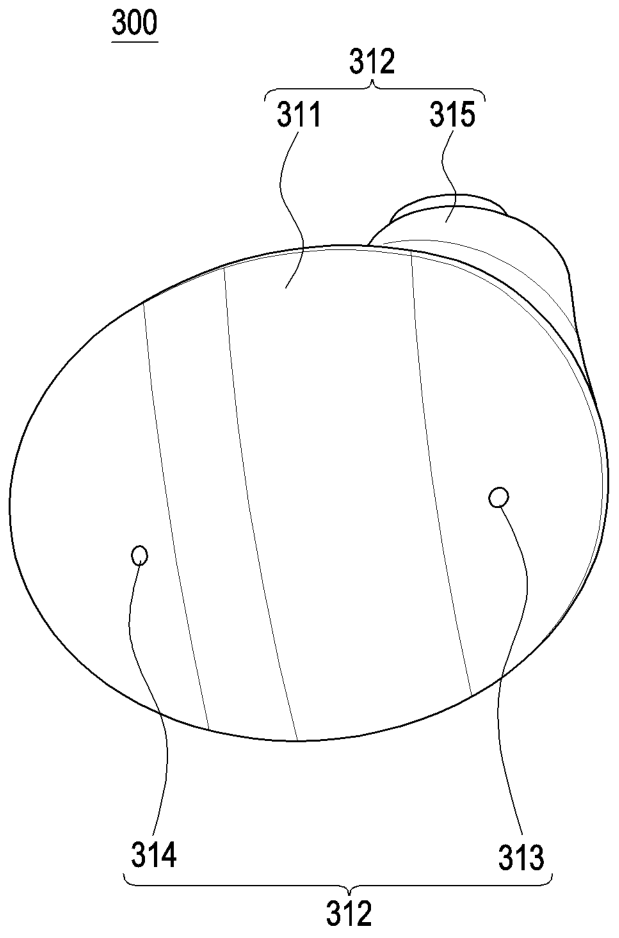
FIG. 3B is a top view of an electronic device according to an embodiment of the disclosure.

FIG. 3B is a top view of an electronic device according to an embodiment of the disclosure.

Referring to FIGS. 3A and 3B, an electronic device 300 may include a housing 310 for accommodating components of the electronic device 300. For example, inside the housing 310, acoustic components (e.g., an audio module 170 in FIG. 2) and electronic components (e.g., the processor 120, the power management module 188, the battery 189, or a wireless communication module 192 in FIG. 1) may be arranged. The configuration of the electronic device 300 of FIGS. 3A and 3B may be substantially the same as all or part of the configuration of the electronic device 101 of FIG. 1.

According to various embodiments, the electronic device 300 may include a wearable electronic device. For example, the electronic device 300 may be worn on a part of a body, for example, an ear or a head. According to an embodiment, the electronic device 300 may include an in-ear earset, an in-ear headset, or a hearing aid.

According to various embodiments, as illustrated in FIGS. 3A and 3B, the electronic device 300 may have an asymmetric shape. According to an embodiment, since the electronic device 300 is configured to have an asymmetric shape, the electronic device 300 may be ergonomically designed, and user convenience may be increased. According to an embodiment, since the electronic device 300 is configured to have an asymmetric shape, the acoustic components (e.g., the audio module 170 in FIG. 2) and electronic components (e.g., the processor 120 in FIG. 1) inside the housing 310 may be arranged to improve acoustic performance.

According to various embodiments, the electronic device 300 may be electrically connected to an external electronic device (e.g., the external electronic device 102 in FIG. 1). According to an embodiment, the electronic device 300 may function as an audio output interface (or, for example, the sound output module 155 in FIG. 1) that outputs a sound signal received from the external electronic device 102 to the outside.

Additionally or alternatively, the electronic device 300 disclosed herein may function as an audio input interface (or the input module 150 in FIG. 1) for receiving an audio signal corresponding to sound acquired from the outside of the electronic device 300.

According to an embodiment, the electronic device 300 may communicate with and/or be controlled by the external electronic device 102. The electronic device 300 may be an interaction-type electronic device that is paired with an external electronic device, such as a smartphone via a communication scheme, such as Bluetooth, and converts data received from the external electronic device 102 to output sound or receives a user's voice to transmit the voice to the external electronic device 102.

According to an embodiment, the electronic device 300 may be wirelessly connected to the external electronic device 102. For example, the electronic device 300 may communicate with the external electronic device 102 via a network (e.g., a short-range wireless communication network or a long-range wireless communication network). The network may include, but is not limited to, a mobile or cellular network, a local area network (LAN) (e.g., Bluetooth communication), a wireless local area network (WLAN), a wide area network (WAN), the Internet, or a small area network (SAN). According to an embodiment, the electronic device 300 may be connected to the external electronic device 102 by wire using a cable (not illustrated).

According to another embodiment, the electronic device 300 may not communicate with the external electronic device 102. In this case, the electronic device 300 may not be controlled through the external electronic device 102, but may be implemented to receive a signal corresponding to sound acquired from the outside according to the operation (or control) of components themselves included in the electronic device 300 and to output an acoustic signal to the outside. For example, the electronic device 300 may be a stand-alone type electronic device that plays music or a video by itself without communicating with the external electronic device 102, and outputs corresponding sound or receives and processes a user's voice.

In various drawings of the disclosure, as an example of the electronic device 300, a kernel-type in-ear earset that is mainly mounted in an external auditory meatus mainly from a pinna to an eardrum may be described as a target. However, it should be noted that the disclosure is not limited thereto. According to another embodiment, although not illustrated in the drawings, the electronic device 300 may target an open-type earphone to be mounted on a pinna.

According to various embodiments, the housing 310 may include a plurality of components. For example, the housing 310 may include a first housing 311 and a second housing 315 connected to the first housing 311. According to an embodiment, the first housing 311 and the second housing 315 may define at least a part of the external appearance of the electronic device 300 and may define an internal space in which the components of the electronic device 300 are accommodated. According to an embodiment, in a state in which a user wears the electronic device 300, at least a part of the second housing 315 comes into contact with or faces the user's body (e.g., an ear), and at least a part of the housing 311 may face away from the user.

According to various embodiments, the housing 310 may include a microphone hole 312. According to an embodiment, the microphone hole 312 may be interpreted as a through hole provided in the first housing 311. According to an embodiment, sound outside the electronic device 300 may pass through the microphone hole 312 to be transmitted to a microphone module (e.g., a microphone module 330 in FIG. 6) located inside the electronic device 300. According to an embodiment, the microphone hole 312 may include a plurality of microphone holes 313 and 314. For example, the microphone hole 312 may include a first microphone hole 313 and/or a second microphone hole 314 spaced apart from the first microphone hole 313.

According to various embodiments, the housing 310 may include a protrusion 316. According to an embodiment, at least a part of the protrusion 316 may be inserted into the user's body (e.g., an ear). For example, the electronic device 300 may be inserted and mounted in the user's body (e.g., an external auditory meatus or a pima of the body) using the protrusion 316. According to an embodiment, the protrusion 316 may be interpreted as a part of the housing 310 extending from the second housing 315. According to an embodiment, an ear tip (not shown) may be additionally mounted to the protrusion 316, and the electronic device 300 may be in close contact with the user's ear using the ear tip. According to an embodiment, the protrusion 316 may include at least one recess (not illustrated), and sound output from a speaker module (e.g., the audio module 170 in FIG. 2) arranged inside the electronic device 300 may be emitted to the outside of the electronic device 300 using the recess located in the protrusion 316.

Figure 4A:
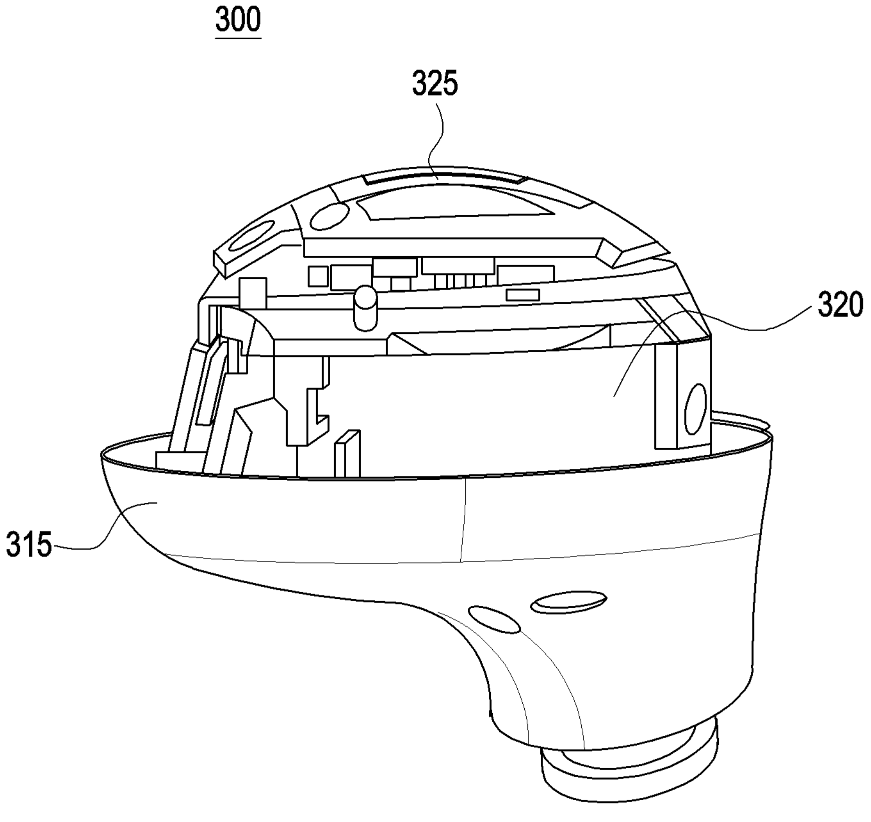
FIG. 4A is a side view of an electronic device from which a first housing is removed according to an embodiment of the disclosure.

FIG. 4A is a side view of an electronic device from which a first housing is removed according to an embodiment of the disclosure.

Figure 4B:
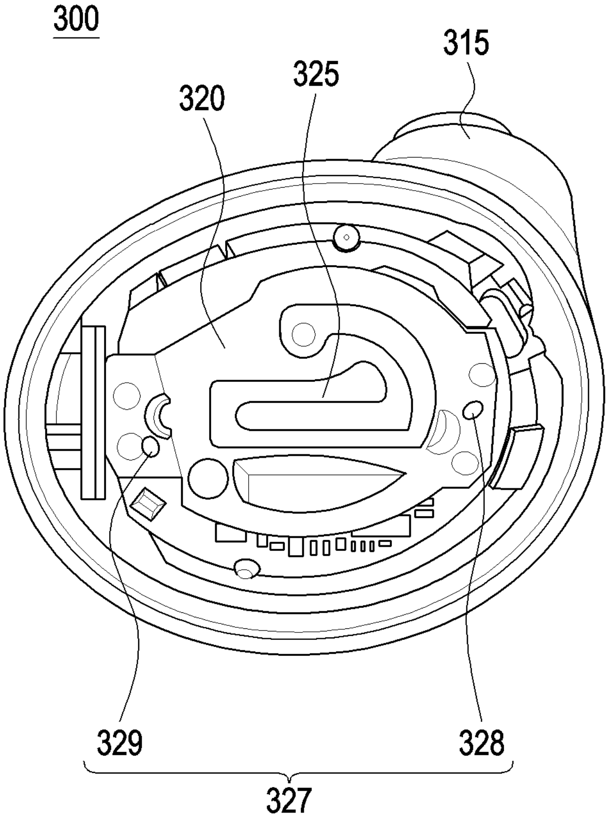
FIG. 4B is a top view of an electronic device from which a first housing is removed according to an embodiment of the disclosure.

FIG. 4B is a top view of an electronic device from which a first housing is removed according to an embodiment of the disclosure.

Figure 5:
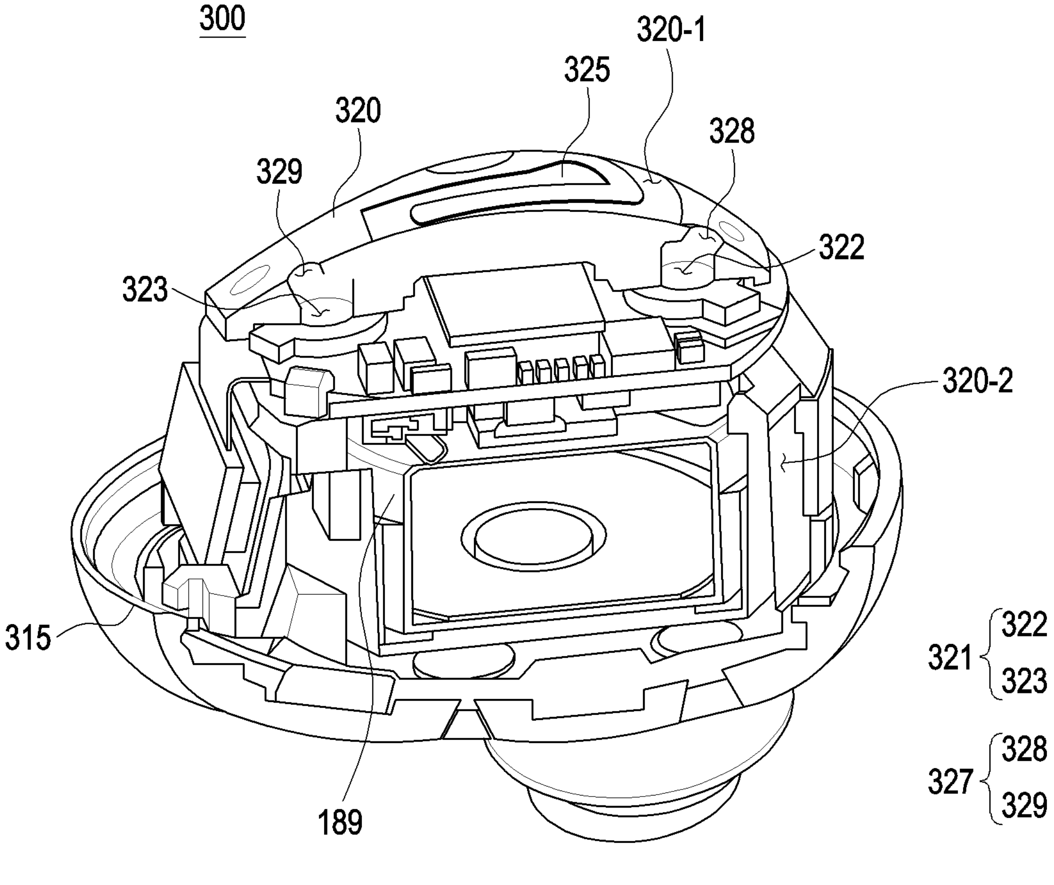
FIG. 5 is a perspective view of an electronic device from which a first housing is removed according to an embodiment of the disclosure.

FIG. 5 is a perspective view of an electronic device from which a first housing is removed according to an embodiment of the disclosure.

Referring to FIGS. 4A, 4B, and 5, the electronic device 300 may include a second housing 315 and a support member 320. The configurations of the electronic device 300 and the second housing 315 of FIGS. 4A, 4B, and 5 may be all or partly the same as those of the electronic device 300 and the second housing 315 of FIGS. 3A and 3B.

According to various embodiments, the support member 320 may be arranged within the housing (e.g., the housing 310 in FIG. 3A). For example, at least a part of the support member 320 may be surrounded by the housing 310 (e.g., the first housing (e.g., the first housing 311 in FIG. 3A) and the second housing 315). According to an embodiment, the support member 320 may include a first support member 320-1 and a second support member 320-2. The first support member 320-1 may be used as an antenna carrier that may include an antenna pattern. According to an embodiment, at least a part of the support member 320 (e.g., the first support member 320-1) may be integrated with the first housing (e.g., the first housing 311 in FIG. 3A). For example, the first support member 320-1 may be connected to the first housing 311 using insert injection molding or double shot injection molding. According to an embodiment, the first housing 311 may be coupled to the second housing 315 in the state of being connected to the first support member 320-1. According to an embodiment, a microphone chamber 321 and/or a connecting passage 327 may be provided or located in the first support member 320-1. According to an embodiment, the support member 320 may include a second support member 320-2 (e.g., an inner housing) that supports at least a part of a component (e.g., the battery 189) of the electronic device 300. According to an embodiment, the first support member 320-1 may be connected to the second support member 320-2. According to another embodiment, the first support member 320-1 may be integrated with the second support member 320-2.

According to various embodiments, the support member 320 (e.g., the first support member 320-1) may include an antenna structure 325. According to an embodiment, the configuration of the antenna structure 325 may be all or partly the same as that of the antenna module 197 of FIG. 1. According to an embodiment, the antenna structure 325 may be a laser direct structuring antenna provided on the support member 320. For example, the support member 320 may include a thermoplastic resin (e.g., polycarbonate) and a pattern configured on the thermoplastic resin using a laser. The antenna structure 325 may include a metal (e.g., copper (Cu) and/or nickel (Ni)) plated or located on the pattern of the support member 320.

According to various embodiments, the antenna structure 325 may be disposed on the surface of the support member 320. According to an embodiment, the antenna structure 325 may face a first housing (e.g., the first housing 311 in FIG. 3A). According to an embodiment, the antenna structure 325 may be located between a first microphone hole (e.g., the first microphone hole 313 in FIG. 3A) and a second microphone hole (e.g., the second microphone hole 314 in FIG. 3A). For example, the antenna structure 325 may be located between a first connecting passage 328 and a second connecting passage 329.

According to various embodiments, the support member 320 may include a microphone chamber 321. According to an embodiment, the microphone chamber 321 may receive sound outside the electronic device 300 from a microphone hole (e.g., the microphone hole 312 in FIG. 3A). For example, external sound or vibration of the electronic device 300 may be transmitted to a microphone module (e.g., the microphone module 330 in FIG. 6) through the microphone hole 312 and the microphone chamber 321. According to an embodiment, the microphone chamber 321 may be interpreted as an empty space provided in the support member 320. According to an embodiment, the microphone chamber 321 may include one or more microphone chambers 322 and 323. For example, the microphone chamber 321 may include at least one of a first microphone chamber 322 connected to the first microphone hole (e.g., the first microphone hole 312 in FIG. 3A) and configured to receive sound from the first microphone hole 312 or a second microphone chamber 323 connected to the second microphone hole (e.g., the second microphone hole 313 in FIG. 3A) and configured to receive sound from the second microphone hole 313.

According to various embodiments, the support member 320 may include a connecting passage 327. According to an embodiment, the connecting passage 327 may connect the microphone hole (e.g., the microphone hole 312 in FIG. 3A) and the microphone chamber 321 to each other. For example, the connecting passage 327 may extend from the microphone chamber 321, and the connecting passage 327 may face at least a part of the microphone hole 312. According to an embodiment, sound outside the electronic device 300 may be transmitted to the microphone chamber 321 through the microphone hole 312 and the connecting passage 327. According to an embodiment, the connecting passage 327 may be interpreted as an empty space provided in the support member 320. According to an embodiment, the connecting passage 327 may be interpreted as a structure spatially connected to the microphone hole 312.

According to an embodiment, the connecting passage 327 may include one or more connecting passages 328 and 329. For example, the connecting passage 327 may include at least one of a first connecting passage 328 facing at least a part of the first microphone hole (e.g., the first microphone hole 312 in FIG. 3A) or a second connecting passage 328 spaced apart from the first connecting passage 328 and facing at least a part of the second microphone hole (e.g., the second microphone hole 313 in FIG. 3A). The first connecting passage 328 may extend from the first microphone chamber 322 toward the first microphone hole 312, and the second connecting passage 329 may extend from the second microphone chamber 323 toward the second microphone hole 313.

Figure 6:
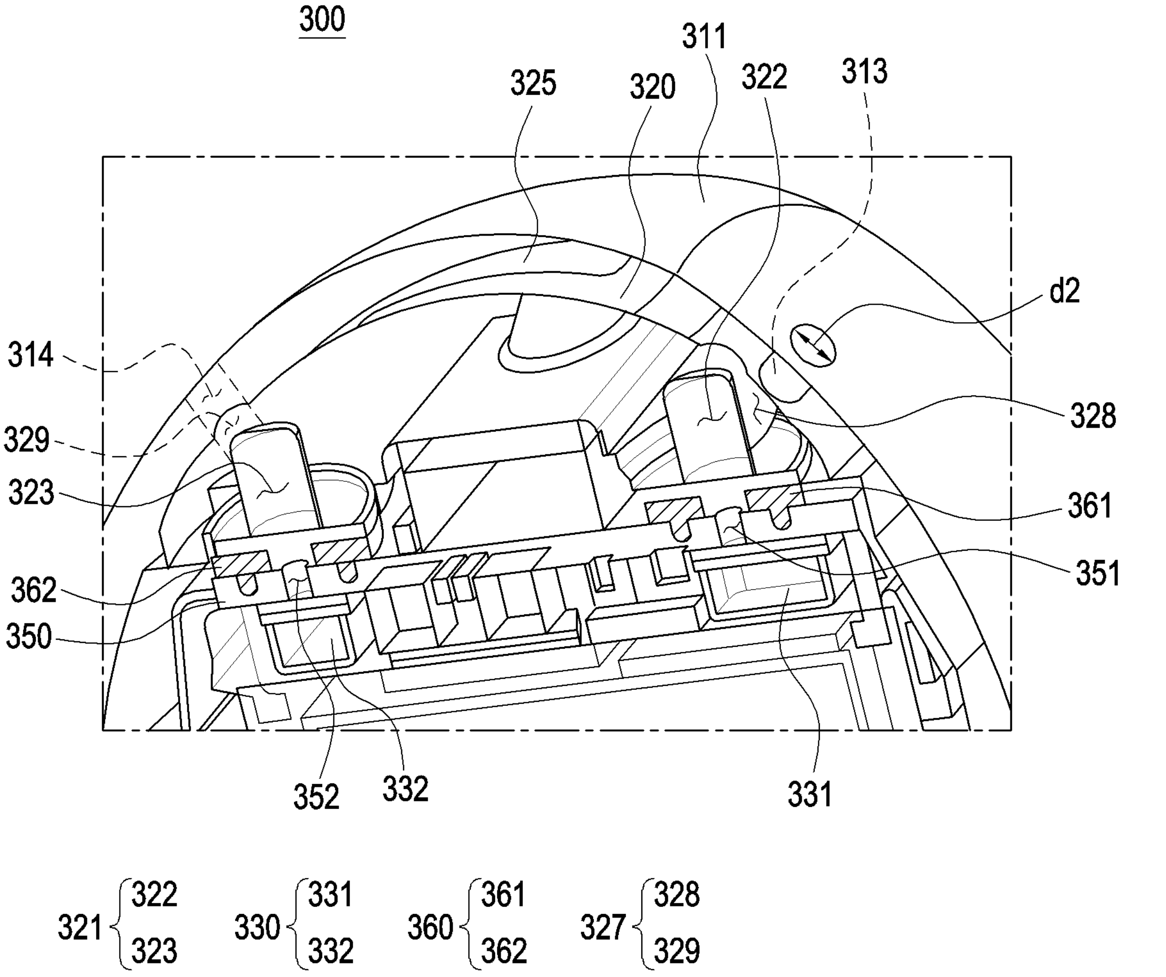
FIG. 6 is a cross-sectional perspective view of an electronic device according to an embodiment of the disclosure.

FIG. 6 is a cross-sectional perspective view of an electronic device according to an embodiment of the disclosure.

Figure 7:
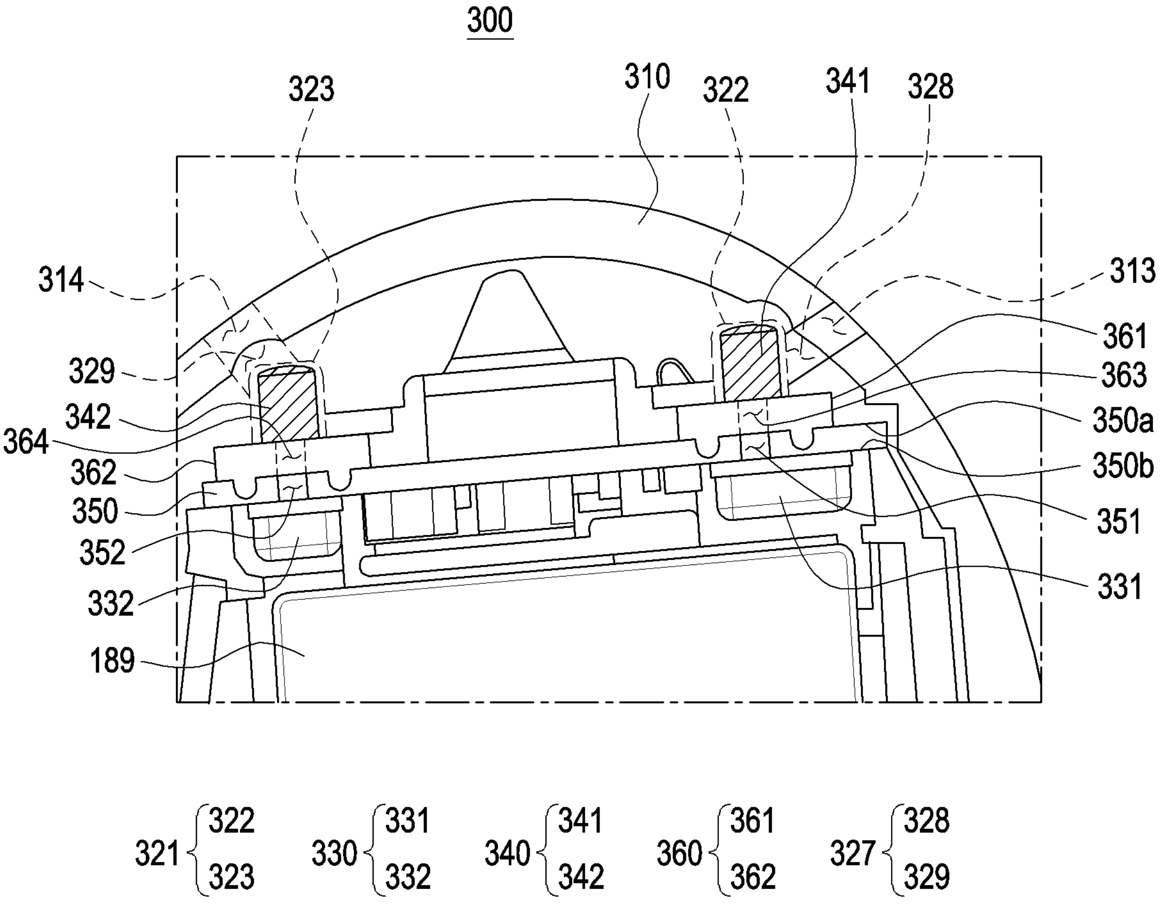
FIG. 7 is a cross-sectional view of an electronic device including a sound absorbing member according to an embodiment of the disclosure.

FIG. 7 is a cross-sectional view illustrating an electronic device according to an embodiment of the disclosure.

Figure 8:
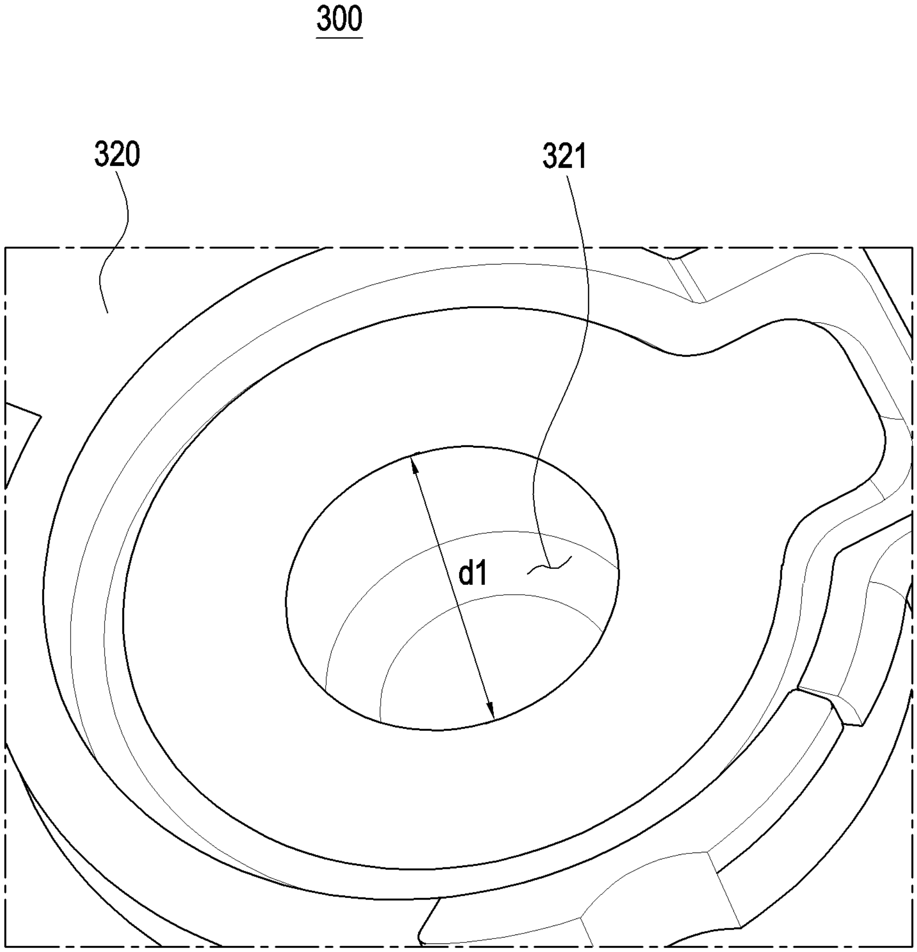
FIG. 8 is a cross-sectional view of a support member according to an embodiment of the disclosure.

FIG. 8 is a cross-sectional view of a support member according to an embodiment of the disclosure.

Referring to FIGS. 6 to 8, the electronic device 300 may include a housing 310, a support member 320, a microphone module 330, and/or a sound absorbing member 340. The configurations of the electronic device 300 and the housing 310 of FIGS. 6 and 7 are all or partially the same as those of the electronic device 300 and the housing 310 of FIG. 3A, and the configuration of the support member 320 of FIGS. 6 to 8 may be is all or partially the same as that of the support member 320 of FIG. 5.

According to various embodiments, the microphone chamber 321 may reduce wind noise of the microphone module 330. For example, at least a part of wind flowing into the electronic device 300 may be transmitted to the microphone module 330 via the microphone chamber 321, and turbulence that vibrates the microphone module 330 may be reduced. According to an embodiment, the volume of the microphone chamber 321 may be greater than the volume of the microphone hole (e.g., the microphone hole 312 in FIG. 3A) and/or the connecting passage 327. According to an embodiment, a first cross-sectional area of the microphone chamber 321 may be larger than a second cross-sectional area of the microphone hole 312. For example, a first diameter d1 of the microphone chamber 321 may be larger than a second diameter d2 of the microphone hole 312. According to an embodiment, the volume of the microphone chamber 321 may be about 1.56 $mm^3$. According to an embodiment, the microphone chamber 321 may have a cylindrical shape, and the connecting passage 327 may be spatially connected to a side surface or an upper surface of the microphone chamber 321.

According to various embodiments, the microphone module 330 may acquire sound outside the electronic device 300. The electronic device 300 may receive audio sound corresponding to sound acquired from the inside or the outside of the electronic device 300 using the microphone module 330. For example, the microphone module 330 may acquire the sound that has passed through the microphone hole 312, the connecting passage 327, and the microphone chamber 321. The configuration of the microphone module 330 may be all or partially the same as the configuration of the audio module 170 of FIG. 2. For example, the microphone module 330 may include the audio input interface 210, the audio input mixer 220, the ADC 230, and/or the audio signal processor 240 of FIG. 2.

According to various embodiments, the microphone module 330 may be arranged in the housing 310. The microphone module 330 may be spatially connected to the microphone chamber 321 provided in the support member 320. According to an embodiment, the printed circuit board 350 may be located between the support member 320 and the microphone module 330, and the microphone module 330 may be arranged on the printed circuit board 350 disposed on the support member 320. According to an embodiment (not illustrated), the microphone module 330 may be located between the microphone chamber 321 and the printed circuit board 350, and the microphone module 330 may include at least one hole (not illustrated) configured to receive the sound transmitted from the microphone chamber 321 and facing at least a part of the microphone chamber 321.

According to an embodiment, the processor (e.g., the processor 120 in FIG. 1) and/or the audio module (e.g., the audio module 170 in FIG. 2) may perform an active noise canceling (ANC) function using the microphone module 330. The active noise canceling function may be a function to reduce noise by acquiring a sound-related wave using a microphone module 330, inverting the phase of the acquired wave, and then outputting the phase-inverted wave via a speaker. Noise generated outside the electronic device 300 may be reduced by destructive interference using the active noise canceling function. According to an embodiment, wind noise may be reduced due to the microphone chamber 321 and/or the sound absorbing member 340, and the performance of the active noise canceling function may be improved.

According to an embodiment, the microphone module 330 may include one or more microphone modules 331 and 332. For example, the microphone module 330 may include a first microphone module 331 and a second microphone module 332 spaced apart from the first microphone module 331. According to an embodiment, the first microphone module 331 may acquire sound passing through the first microphone hole 313, the first connecting passage 328, the first microphone chamber 322, a first opening 363, and/or the first sound absorbing member 341, and the second microphone module 332 may acquire sound passing through the second microphone hole 314, the second connecting passage 329, the second microphone chamber 323, a second opening 364, and/or a second sound absorbing member 342. According to an embodiment, the electronic device 300 may perform an active noise canceling function using at least one of the first microphone module 331 or the second microphone module 332. According to an embodiment, of the first microphone module 331 or the second microphone module 332, the microphone module (e.g., the second microphone module 332) closest to the user's ear may function as a main microphone for acquiring sound outside the electronic device 300 (e.g., the user's voice), and the other microphone module (e.g., the first microphone module 331) may function as a sub-microphone for performing an active noise canceling function.

According to various embodiments, the electronic device 300 may include a sound absorbing member 340. According to an embodiment, the sound absorbing member 340 may reduce specific noise from sound transmitted to the microphone module 330. For example, the sound absorbing member 340 may reduce sound corresponding to wind noise while maintaining sound corresponding to the pink noise substantially equally. According to an embodiment, the sound absorbing member 340 may include an open cell polyurethane foam.

According to various embodiments, the sound absorbing member 340 may be arranged in the microphone chamber 321. For example, the sound outside the electronic device 300, which has passed through the microphone hole 312, may be transmitted to the microphone module 330 via the sound absorbing member 340 arranged in the microphone chamber 321. According to an embodiment, the sound absorbing member 340 may include one or more sound absorbing members 341 and 342. For example, the sound absorbing member 340 may include at least one of a first sound absorbing member 341 arranged in the first microphone chamber 322 or a second sound absorbing member 342 arranged in the second microphone chamber 323. According to an embodiment, the sound absorbing member 340 may be arranged in a microphone module (e.g., the first microphone module 331) for performing active noise cancellation.

According to various embodiments, the electronic device 300 may include a printed circuit board 350. According to an embodiment, the microphone module 330 may be arranged on the printed circuit board 350. According to an embodiment, the printed circuit board 350 may include one or more through holes 351 and 352 facing at least a part of the microphone module 330 and at least a part of the microphone chamber 321. For example, the printed circuit board 350 may include at least one of a first through hole 351 facing the first microphone module 331 or a second through hole 352 facing the second microphone module 332. According to an embodiment, at least a part of the sound transmitted to the inside of the electronic device 300 via the microphone hole 312, the connecting passage 327, the microphone chamber 321, or the sound absorbing member 340 may be transmitted to the microphone module 330 via the through holes 351 and 352. According to an embodiment, the printed circuit board 350 may include a first surface 350*a* facing the microphone chamber 321 and/or a sealing member 360 and a second surface 350*b* opposite to the first surface 350*a*, wherein the microphone module 330 may be located on the second surface 350*b*.

According to various embodiments, the electronic device 300 may include a sealing member 360. According to an embodiment, the sealing member 360 may seal at least a part of a space between the support member 320 and the printed circuit board 350. According to an embodiment, the sealing member 360 may be arranged between the support member 320 and the printed circuit board 350. According to an embodiment, at least a part of the sealing member 360 may have a closed loop shape. For example, the sealing member 360 may be arranged on the first surface 350*a* of the printed circuit board 350 to surround the periphery of the through-holes 351 and 352 such that the sound passing through the microphone chamber 321 is transmitted to the through holes 351 and 352 and/or the microphone module 330. For example, the sealing member 360 may include openings 363 and 364 spatially connected to the through holes 351 and 352. According to an embodiment, the sealing member 360 may include an elastic body (e.g., rubber). According to an embodiment, the sealing member 360 may include one or more sealing members 361 and 362. For example, the sealing member 360 may include a first sealing member 361 and a second sealing member 362 spaced apart from the first sealing member 361. According to an embodiment, the first sealing member 361 may face the first microphone chamber 321, and the second sealing member 362 may face the second microphone chamber 322. For example, the first sealing member 361 may be located between the first microphone chamber 322 and the first microphone module 331, and the second sealing member 362 may be located between the second microphone chamber 323 and the second microphone module 332. According to an embodiment, the first sealing member 361 may include a first opening 363 for transmitting the sound passing through the first microphone hole 313 and/or the first microphone chamber 322 to the first microphone module 331, and the second sealing member 362 may include a second opening 364 for transmitting the sound passing through the second microphone hole 314 and/or the second microphone chamber 323 to the second microphone module 332.

Figure 9:
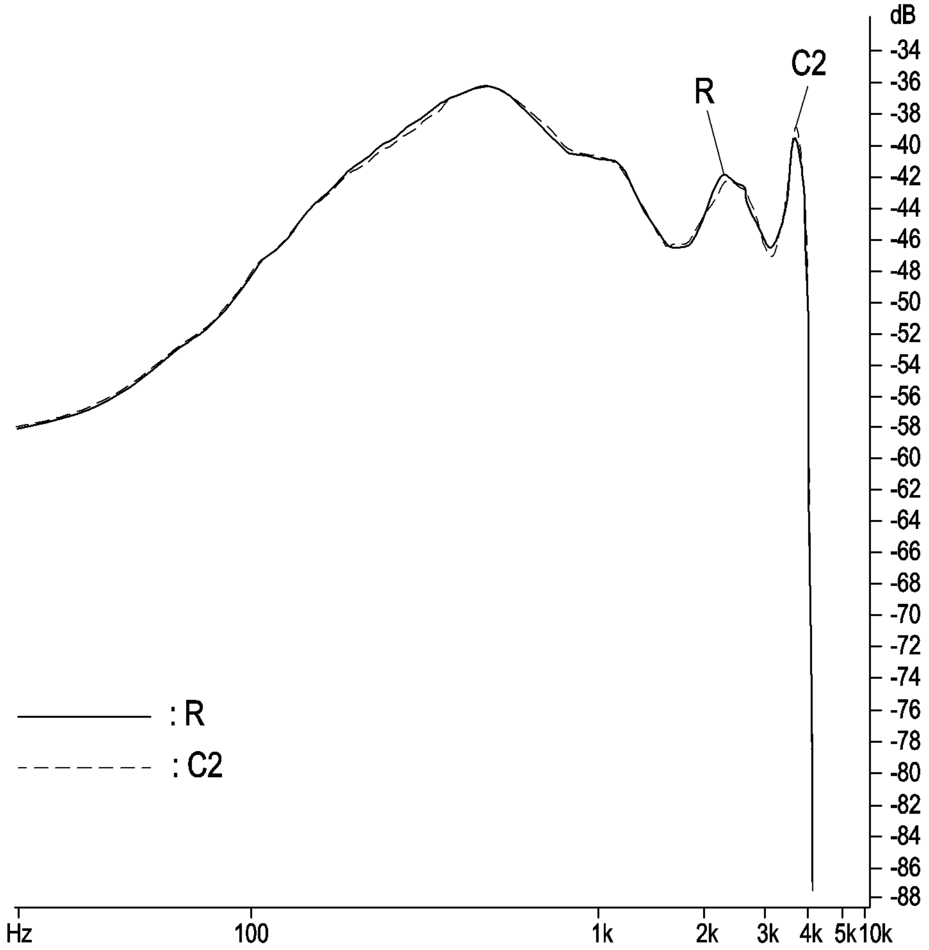
FIG. 9 is a graph illustrating pink noise that is changed based on a microphone chamber and a sound absorbing member according to an embodiment of the disclosure.

FIG. 9 is a graph illustrating pink noise that is changed based on a microphone chamber and a sound absorbing member according to an embodiment of the disclosure.

Figure 10:
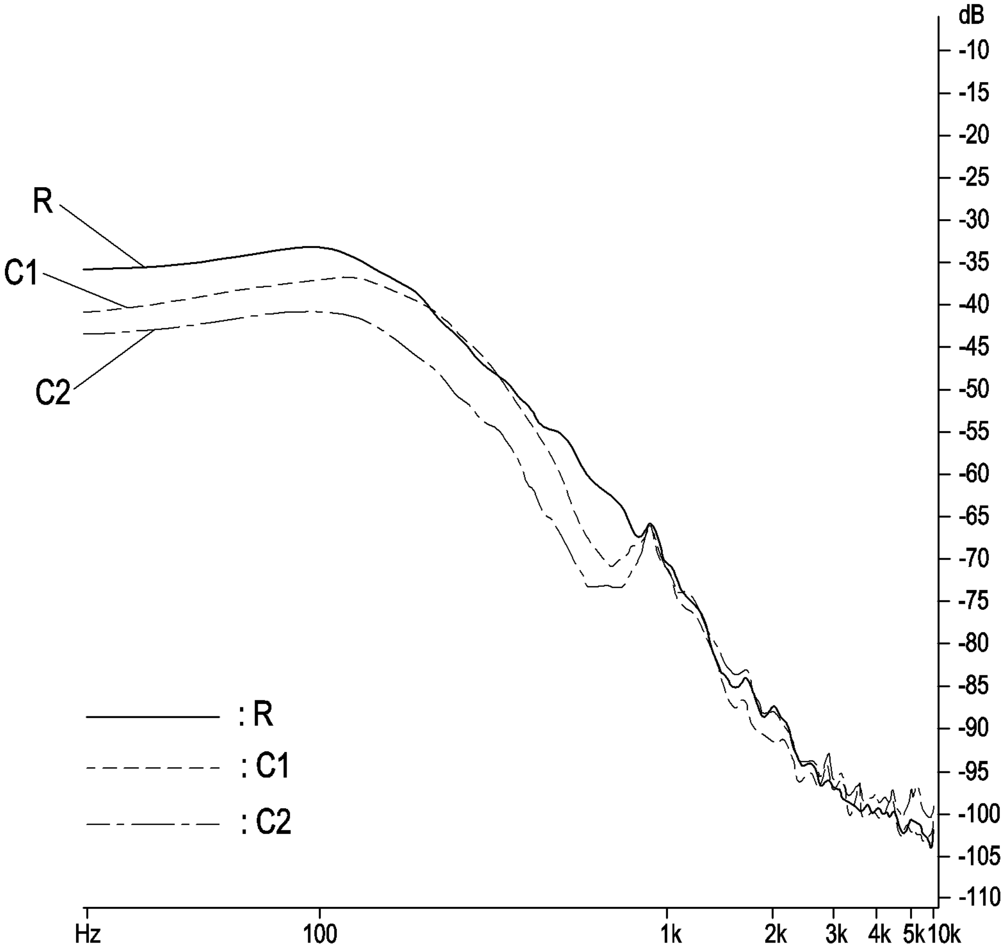
FIG. 10 is a graph illustrating wind noise that is changed based on at least one of a microphone chamber or a sound absorbing member according to an embodiment of the disclosure.

FIG. 10 is a graph illustrating wind noise that is changed based on at least one of a microphone chamber or a sound absorbing member according to an embodiment of the disclosure. FIGS. 9 and 10 may represent frequency-response graphs. For example, the vertical axes of FIGS. 9 and 10 may represent the magnitude (dB) of response, and the horizontal axes may represent frequency (Hz).

Referring to FIG. 9, the pink noise of an electronic device of a reference embodiment (R) that does not include a microphone chamber (e.g., the microphone chamber 321 in FIG. 7) and a sound absorbing member (e.g., the sound absorbing member 340 in FIG. 7) may be substantially the same as the pink noise of the electronic device of the second embodiment C2 (e.g., the electronic device 300 in FIG. 7) including the microphone chamber 321 and the sound absorbing member 340. For example, even if the electronic device 300 of the second embodiment C2 includes the microphone chamber 321 and the sound absorbing member 340, the performance of the microphone module (e.g., the microphone module 330 in FIG. 7) for acquiring sound outside the electronic device 300 may be substantially the same as that of the electronic device of the reference embodiment R. The pink noise may have a noise level that is substantially evenly reproduced in a reproduction frequency band. For example, the pink noise may be noise obtained by attenuation-correcting white noise by about 3 decibels (dB) per octave.

Referring to FIG. 10, the wind noise in the electronic device (e.g., the electronic device 300 in FIG. 7) of the second embodiment C2 that includes a microphone chamber (e.g., a microphone chamber 321 in FIG. 7) and a sound absorbing member (e.g., the sound absorbing member 340 of FIG. 7) and/or the wind noise in the electronic device (e.g., the electronic device 300 in FIG. 6) of the first embodiment C1 that includes the microphone chamber 321 may be reduced compared to the wind noise in the electronic device of the reference embodiment R that does not include the microphone chamber 321 and/or the sound absorbing member 340. According to an embodiment, in a specific frequency band (e.g., 0 Hz to 1000 Hz), the window noise in the electronic device 300 of the first embodiment C1 may be lower than about 2 decibels (dB) to about 3 decibels (dB) than the wind noise in the electronic device of the reference embodiment R. According to an embodiment, in a specific frequency band (e.g., 0 Hz to 1000 Hz), the window noise in the electronic device 300 of the second embodiment C2 may be lower than about 6 decibels (dB) to about 7 decibels (dB) than the wind noise in the electronic device of the reference embodiment R. According to an embodiment, wind noise may be interpreted as noise generated due to the vibration of a microphone module (e.g., the microphone module 330 in FIG. 7) due to turbulence of wind flowing into the electronic device. According to an embodiment, since wind noise is reduced, the active noise canceling function of the microphone module (e.g., the microphone module 330 of FIG. 7) can be improved.

According to various embodiments of the disclosure, the electronic device (e.g., the electronic device 300 of FIG. 3A) may include a housing (e.g., the housing 310 in FIG. 3A) including a microphone hole (e.g., the microphone hole 312 in FIG. 3A), a support member (e.g., the support member 320 in FIG. 4A) connected to the housing, wherein the support member includes an antenna structure (e.g., the antenna structure 325 in FIG. 4B) facing at least a part of the housing, and a microphone chamber (e.g., the microphone chamber 321 in FIG. 5) configured to receive external sound of the electronic device from the microphone hole, and a microphone module (e.g., the microphone module 330 in FIG. 6) connected to the support member and configured to receive external sound of the electronic device via the microphone hole and the microphone chamber.

According to various embodiments of the disclosure, the electronic device may further include a sound absorbing member (e.g., the sound absorbing member 340 in FIG. 7) disposed in the microphone chamber.

According to various embodiments of the disclosure, the sound absorbing member may include an open cell polyurethane foam.

According to various embodiments of the disclosure, the support member may include a connecting passage (e.g., the connecting passage 327 of FIG. 6) extending from the microphone chamber, wherein at least a part of connecting passage faces the microphone hole.

According to various embodiments of the disclosure, the microphone hole may include a first microphone hole (e.g., the first microphone hole 313 in FIG. 3B) and a second microphone hole (e.g., the second microphone hole 314 in FIG. 3B) spaced apart from the first microphone hole, and the microphone module may include a first microphone module (e.g., the first microphone module 351 in FIG. 6) configured to acquire sound through the first microphone hole, and a second microphone module (e.g., the second microphone module 352 in FIG. 6) configured to acquire a sound through the second microphone hole.

According to various embodiments of the disclosure, the microphone chamber may include a first microphone chamber (e.g., the first microphone chamber 322 in FIG. 6) configured to receive sound from the first microphone hole and a second microphone chamber (e.g., the second microphone chamber 323 in FIG. 6) configured to receive sound from the second microphone hole.

According to various embodiments of the disclosure, at least a part of the antenna structure may be located between the first microphone hole and the second microphone hole.

According to various embodiments of the disclosure, the housing and the support member may be integrally formed using double injection molding, and at least a part of the support member may be surrounded by the housing.

According to various embodiments of the disclosure, the electronic device may further include a printed circuit board (e.g., the printed circuit board 350 of FIG. 6) disposed on the support member, wherein the printed circuit board accommodates the microphone, and the printed circuit board may include at least one through hole (e.g., the through holes 351 and 352 in FIG. 6) facing at least a part of the microphone chamber.

According to various embodiments of the disclosure, the electronic device may further include a sealing member (e.g., the sealing members 361 and 362 in FIG. 6) disposed between the support member and the printed circuit board.

According to various embodiments of the disclosure, a first cross-sectional area of the microphone chamber may be larger than a second cross-sectional area of the microphone hole.

According to various embodiments of the disclosure, the housing may include a first housing (e.g., the first housing 311 in FIG. 3A) in which the microphone hole is located, and a second housing (e.g., the second housing 315 of FIG. 3A) connected to the first housing and including a protrusion (e.g., the protrusion 316 in FIG. 3A) in which at least one recess (not illustrated) is formed.

According to various embodiments of the disclosure, the electronic device may further include at least one speaker module disposed in the housing and configured to output sound to an exterior of the electronic device using the recess.

According to various embodiments of the disclosure, the electronic device may further include a battery disposed in the housing and configured to supply power to the microphone module.

According to various embodiments of the disclosure, the antenna structure may be a laser direct structuring (LDS) antenna.

According to various embodiments of the disclosure, the electronic device may include a housing (e.g., the housing 310 in FIG. 3A) including a first microphone hole (e.g., the first microphone hole 313 in FIG. 3A) and a second microphone hole (e.g., the second microphone hole 314 in FIG. 3A) spaced apart from the first microphone hole, a support member (e.g., the support member 320 in FIG. 5) connected to the housing and including an antenna structure (e.g., the antenna structure 325 in FIG. 4A) facing at least a part of the housing, wherein the support member includes a first microphone chamber (e.g., the first microphone chamber 322 in FIG. 5) connected to the first microphone hole and a second microphone chamber (e.g., the second microphone chamber 323 in FIG. 5) connected to the second microphone hole, a microphone module (e.g., the microphone module 350 in FIG. 6) including a first microphone module (e.g., the first microphone module 351 in FIG. 6) configured to acquire sound through the first microphone hole and the first microphone chamber, and a second microphone module (e.g., the second microphone module 352 in FIG. 6) configured to acquire sound through the second microphone hole and the second microphone chamber, and a sound absorbing member (e.g., the sound absorbing member 340 in FIG. 6) disposed in at least one of the first microphone chamber or the second microphone chamber.

According to various embodiments of the disclosure, the sound absorbing member may include an open cell polyurethane foam.

According to various embodiments of the disclosure, the support member may include a first connecting passage (e.g., the first connecting passage 328 in FIG. 6) extending from the first microphone chamber, wherein at least a part of the first connecting passage faces the first microphone hole, and a second connecting passage (e.g., the second connecting passage 329 of FIG. 6) extending from the second microphone chamber, wherein at least a part of the second connecting passage faces the second microphone hole.

According to various embodiments of the disclosure, the electronic device may further include a printed circuit board (e.g., the printed circuit board 350 of FIG. 6) disposed on the support member, wherein the printed circuit board includes a first through hole (e.g., the first through hole 351 in FIG. 6) located between at least a part of the first microphone chamber and the first microphone module, and a second through hole (e.g., the second through hole 352 in FIG. 6) located between at least a part of the second microphone chamber and the second microphone module.

According to various embodiments of the disclosure, the housing and the support member may be integrally formed using double injection molding, and at least a part of the support member may be surrounded by the housing.

It may be apparent to a person ordinarily skilled in the technical field to which the disclosure belongs that the above-described electronic device including a microphone module according to the disclosure is not limited by the above-described embodiments and drawings, and can be variously substituted, modified, and changed within the technical scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a housing including a microphone hole;
a support member connected to the housing, wherein the support member includes an antenna structure facing at least a part of the housing and a microphone chamber formed toward the microphone hole on a first side of the support member;
a microphone module connected to the support member and configured to receive external sound of the electronic device through the microphone hole and the microphone chamber; and
a printed circuit board disposed on a second side of the support member opposite to the first side of the support member, and including at least one through hole connecting the microphone chamber and the microphone module.

2. The electronic device of claim 1, further comprising:
a sound absorbing member disposed in the microphone chamber.

3. The electronic device of claim 2, wherein the sound absorbing member includes an open cell polyurethane foam.

4. The electronic device of claim 1, wherein the support member includes a connecting passage extending from the microphone chamber wherein at least a part of the connecting passage faces the microphone hole.

5. The electronic device of claim 1,
wherein the microphone hole includes a first microphone hole and a second microphone hole spaced apart from the first microphone hole, and
wherein the microphone module includes a first microphone module configured to acquire sound through the first microphone hole, and a second microphone module configured to acquire sound through the second microphone hole.

6. The electronic device of claim 5, wherein the microphone chamber includes a first microphone chamber configured to receive sound from the first microphone hole and a second microphone chamber configured to receive sound from the second microphone hole.

7. The electronic device of claim 5, wherein at least a part of the antenna structure is located between the first microphone hole and the second microphone hole.

8. The electronic device of claim 1,
wherein the housing and the support member are integrally formed using double injection molding, and
wherein at least a part of the support member is surrounded by the housing.

9. The electronic device of claim 1,
wherein the printed circuit board accommodates the microphone module.

10. The electronic device of claim 9, further comprising:
a sealing member disposed between the support member and the printed circuit board.

11. The electronic device of claim 1, wherein a first cross-sectional area of the microphone chamber is larger than a second cross-sectional area of the microphone hole.

12. The electronic device of claim 1, wherein the housing includes:
a first housing in which the microphone hole is located, and a second housing connected to the first housing and including a protrusion in which at least one recess is formed.

13. The electronic device of claim 12, further comprising:
at least one speaker module disposed in the housing and configured to output sound to an exterior of the electronic device using the recess.

14. The electronic device of claim 1, further comprising:
a battery disposed within the housing and configured to supply power to the microphone module.

15. The electronic device of claim 1, wherein the antenna structure is a laser direct structuring (LDS) antenna.

16. An electronic device comprising:
a housing including a first microphone hole and a second microphone hole spaced apart from the first microphone hole;
a support member connected to the housing and including an antenna structure facing at least a part of the housing, wherein the support member includes a first microphone chamber connected to the first microphone hole and a second microphone chamber connected to the second microphone hole absence, and wherein the first microphone chamber is formed toward the first microphone hole on a first side of the support member and the second microphone chamber is formed toward the second microphone hole on the first side of the support member;
a microphone module including a first microphone module configured to acquire sound through the first microphone hole and the first microphone chamber, and a second microphone module configured to acquire sound through the second microphone hole and the second microphone chamber module;
a printed circuit board disposed on a second side of the support member opposite to the first side of the support member, and including a first through hole connecting the first microphone chamber and the first microphone module and a second through hole connecting the second microphone chamber and the second microphone module; and
a sound absorbing member disposed in at least one of the first microphone chamber or the second microphone chamber.

17. The electronic device of claim 16, wherein the sound absorbing member includes an open cell polyurethane foam.

18. The electronic device of claim 16,
wherein the support member includes a first connecting passage extending from the first microphone chamber,
wherein at least a part of the first connecting passage faces the first microphone hole, and a second connecting passage extending from the second microphone chamber, and
wherein at least a part of the second connecting passage faces the second microphone hole.

19. The electronic device of claim 16,
wherein the first through hole is located between at least a part of the first microphone chamber and the first microphone module, and the second through hole is located between at least a part of the second microphone chamber and the second microphone module.

20. The electronic device of claim 16,
wherein the housing and the support member are integrally formed using double injection molding, and
wherein at least a part of the support member is surrounded by the housing.

* * * * *